(12) United States Patent
Komiyama et al.

(10) Patent No.: US 10,601,083 B2
(45) Date of Patent: Mar. 24, 2020

(54) SYSTEMS AND METHODS FOR BATTERY DISCHARGE CONTROL

(71) Applicant: TOYOTA MOTOR EUROPE, Brussels (BE)

(72) Inventors: Keita Komiyama, Evere (BE); Yuki Katoh, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 21 days.

(21) Appl. No.: 16/076,091

(22) PCT Filed: Feb. 17, 2016

(86) PCT No.: PCT/EP2016/053331
§ 371 (c)(1),
(2) Date: Aug. 7, 2018

(87) PCT Pub. No.: WO2017/140355
PCT Pub. Date: Aug. 24, 2017

(65) Prior Publication Data
US 2019/0198940 A1    Jun. 27, 2019

(51) Int. Cl.
*H02J 7/04*    (2006.01)
*H01M 10/44*    (2006.01)
*H02J 7/00*    (2006.01)

(52) U.S. Cl.
CPC ....... *H01M 10/445* (2013.01); *H01M 10/443* (2013.01); *H01M 10/448* (2013.01);
(Continued)

(58) Field of Classification Search
CPC ............. H01M 10/445; H01M 10/443; H01M 10/448; H02J 7/0063; H02J 7/0029;
(Continued)

(56) References Cited

U.S. PATENT DOCUMENTS 7,244,527 B2    7/2007    Klein
7,592,776 B2    9/2009    Tsukamoto et al.
(Continued)

FOREIGN PATENT DOCUMENTS

JP    2006-012761 A    1/2006
JP    2011-135680 A    7/2011
(Continued)

OTHER PUBLICATIONS

Aug. 18, 2016 International Search Report issued in International Patent Application No. PCT/EP2016/053331.
(Continued)

*Primary Examiner* — Edward Tso
*Assistant Examiner* — Ahmed H Omar
(74) *Attorney, Agent, or Firm* — Oliff PLC (57) ABSTRACT

A discharging control system for a battery includes temperature sensing means configured to provide a temperature value associated with the battery, voltage sensing means configured to provide a voltage value associated with the battery, pressure sensing means configured to provide a pressure value associated with an internal portion of the battery, and a controller. The controller is configured to determine, before a discharging process is started, a threshold pressure change associated with a discharge of the battery based on map data selected from a predetermined data map associated with the battery, monitor, during the discharging process, a present voltage value obtained by the voltage sensing means, a current pressure value, and a total pressure change based on the current pressure value obtained by the pressure sensing means, permit continuation of the discharging process when the present voltage value falls below a first lower limit voltage value if the total pressure change is less than the threshold pressure change and the current pressure value is greater than a predeter-
(Continued)

mined minimum threshold pressure, and prohibit continuation of the discharging process when any one of the following conditions is true: (i) the present voltage value falls below a second lower limit voltage value that is lower than the first lower limit voltage value; (ii) the total pressure change is greater than or equal to the threshold pressure change; or (iii) the current pressure value is lower than the predetermined minimum threshold pressure.

21 Claims, 5 Drawing Sheets (52) U.S. Cl.
CPC .......... *H02J 7/0029* (2013.01); *H02J 7/0063* (2013.01); *H02J 2007/004* (2013.01); *H02J 2007/0067* (2013.01)

(58) Field of Classification Search
CPC ......... H02J 2007/0067; H02J 2007/004; H02J 7/0068; H02J 7/022; H02J 7/0073; H02J 7/0031; H02J 2007/0037; H02J 7/008; H02J 7/027; H02J 7/045; H02J 9/061; H02J 7/0091; G06F 17/30286; G06F 17/30749; Y02E 60/12; Y02B 40/90

USPC ........................................................ 320/127
See application file for complete search history.

(56) References Cited

U.S. PATENT DOCUMENTS

| | | |
|---|---|---|
| 2004/0004464 A1 | 1/2004 | Tsukamoto et al. |
| 2004/0038123 A1 | 2/2004 | Hisamitsu et al. |
| 2005/0029990 A1 | 2/2005 | Tsukamoto et al. |
| 2005/0084754 A1 | 4/2005 | Klein |
| 2006/0093896 A1 | 5/2006 | Hong et al. |

FOREIGN PATENT DOCUMENTS

| | | |
|---|---|---|
| JP | 2013-125701 A | 6/2013 |
| JP | 2014-120335 A | 6/2014 |
| WO | 02/035618 A1 | 5/2002 |

OTHER PUBLICATIONS

Aug. 18, 2016 Written Opinion issued in International Patent Application No. PCT/EP2016/053331.
Dec. 3, 2019 Office Action issued in Japanese Patent Application No. 2018-543316.

SYSTEMS AND METHODS FOR BATTERY DISCHARGE CONTROL

FIELD OF THE DISCLOSURE

The present disclosure is related to systems and methods for controlling discharging of a battery. More particularly, the present disclosure is related to managing a discharge state based on an internal pressure measure within the battery.

BACKGROUND OF THE DISCLOSURE

During discharging of a battery, e.g., a lithium ion battery, total voltage at the battery pack may decrease sharply due to overvoltage at certain laminating parts at which degradation has occurred. Thereby, total voltage reaches a lower limit voltage, which is set in order to prevent over-discharging, and the discharging system stops discharging considering that the battery pack is fully charged.

However, as degradation of the battery progresses the battery pack is typically not yet fully discharged (i.e., state of charge (SOC)>0%) when discharging is stopped as a result of reaching the lower limit voltage. Therefore, available amount of energy from the battery decreases due to degradation dispersion, among others.

US 2004/0038123, also published as JP 2004-087238, is directed to a stack type battery with a plurality of unit cells stacked in a stack direction to be connected in series, and shared voltage measurement tab electrodes formed on the plurality of unit cells, respectively, to allow voltages to be measured for the plurality of unit cells such that the shared voltage measurement tab electrodes are disposed at deviated positions on a side surface of the stack type battery in a direction intersecting the stack direction. However, the system of US 2004/0038123 requires voltage sensors between each laminated portion, thereby resulting in high cost. In addition, the higher the number of laminations, the more difficult it becomes to place a voltage sensor therebetween.

SUMMARY OF THE INVENTION

The inventors of the present invention desire to enable increasing energy stored in a battery by enabling a lower discharge level, while limiting the possibility for over-discharging of and damage to the battery.

Therefore, according to embodiments of the present disclosure, a discharging control system for a battery is provided. The discharging control may include temperature sensing means configured to provide a temperature value associated with the battery, voltage sensing means configured to provide a voltage value associated with the battery, pressure sensing means configured to provide a pressure value associated with an internal portion of the battery, and a controller. The controller may be configured to determine, before a discharging process is started, a threshold pressure change associated with a discharge of the battery based on map data selected from a predetermined data map associated with the battery, monitor, during the discharging process, a present voltage value obtained by the voltage sensing means, a current pressure value, and a total pressure change based on the current pressure value obtained by the pressure sensing means, permit continuation of the discharging process when the present voltage value falls below a first lower limit voltage value if the total pressure change is less than the threshold pressure change and the current pressure value is greater than a predetermined minimum threshold pressure, and prohibit continuation of the discharging process when any one of the following conditions is true:

(i) the present voltage value falls below a second lower limit voltage value that is lower than the first lower limit voltage value;

(ii) the total pressure change is greater than or equal to the threshold pressure change; or (iii) the current pressure value is lower than the predetermined minimum threshold pressure.

By providing such a system it may be possible to discount an allowable voltage range to more completely charge a battery that has undergone degradation. This in turn enables greater energy availability with reduced risk of damage to the battery.

The selection of the map data may be based on a pre-discharging temperature value obtained from the temperature sensing means, a pre-discharging voltage value obtained from the voltage sensing means, and a pre-discharging pressure value obtained from the pressure sensing means.

The controller may be configured to decrease the first lower limit voltage value when the present voltage value falls below the first lower limit voltage value, if the total pressure change is less than the threshold pressure change and the current pressure value is higher than the minimum predetermined pressure.

The controller may be configured to compensate for creep in one or more portions of the battery by modifying at least one of the pressure information based on an initial internal pressure measurement, the pre-discharging process pressure value, and the pre-discharging temperature value.

The controller may be configured to compare the initial internal pressure measurement and the pre-discharging pressure value, and when the initial internal pressure measurement is greater than the pre-discharging process pressure value, select new map data associated with the pre-charging pressure value.

The predetermined map may include a collection of experimentally measured internal pressures, open circuit voltages, and temperatures of a representative battery under representative conditions of use of the battery.

The pressure sensing means may include at least one tactile sensor embedded in the battery.

The at least one tactile sensor may be positioned parallel to a laminated direction of a battery cell of the battery.

A state of charge sensor configured to determine a state of charge of the battery may be included.

The voltage sensing means may include a dummy cell connected to one or more battery packs associated with the battery.

The voltage value may be an open circuit voltage of the battery.

The battery may be at least one of a lithium-ion solid-state battery and a lithium-ion liquid electrolyte battery.

According to further embodiments of the present disclosure, a vehicle comprising the discharging control system according to any of the embodiments above may be provided.

According to still further embodiments of the present disclosure, a method for discharging a battery is provided. The method may include determining a temperature value associated with the battery, determining a voltage value associated with the battery, determining a pressure value associated with an internal portion of the battery, determining, before a discharging of the battery is started, a threshold pressure change associated with a full discharge of the battery based on map data selected from a predetermined data map associated with the battery, discharging the battery, monitoring, during the discharging, a present voltage value obtained by the voltage sensing means and a total pressure change based on a present pressure value obtained by the pressure sensing means, permitting continuation of the discharging process when the present voltage value falls below a first lower limit voltage value if the total pressure change is less than the threshold pressure change and the current pressure value is greater than a predetermined minimum threshold pressure, and prohibiting continuation of the discharging process when any one of the following conditions is true:

(i) the present voltage value falls below a second lower limit voltage value that is lower than the first lower limit voltage value;

(ii) the total pressure change is greater than or equal to the threshold pressure change; or (iii) the current pressure value is lower than the predetermined minimum threshold pressure.

By providing such a method it may be possible to discount an allowable voltage range to more completely charge a battery that has undergone degradation. This in turn enables greater energy availability with reduced risk of damage to the battery.

The selection of the map data is based on a pre-charging temperature value obtained from the temperature sensing means, a pre-charging voltage value obtained from the voltage sensing means, and a pre-charging pressure value obtained from the pressure sensing means The method may also include decreasing the upper limit voltage value when the present voltage value falls below the lower limit voltage value, and the total pressure change is less than the threshold pressure change.

The method may include compensating for creep in one or more portions of the battery by modifying the selected map data based on an initial internal pressure measurement, the pre-charging process pressure value, and the pre-charging temperature value.

The method may include comparing the initial internal pressure measurement and the pre-discharging pressure value, and when the initial internal pressure measurement is greater than the pre-discharging process pressure value, selecting new map data associated the pre-discharging pressure value.

The new threshold pressure change may be set based on a predetermined map created as a function of experimentally measured internal pressures, open circuit voltages, and temperatures of a representative battery under representative conditions.

The method may include determining a state of charge of the battery and modifying the threshold pressure change based on the state of charge of the battery before the discharging is started.

The battery may be at least one of a lithium-ion solid-state battery and a lithium-ion liquid electrolyte battery.

Additional objects and advantages of the invention will be set forth in part in the description which follows, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the disclosure.

DESCRIPTION OF THE EMBODIMENTS

Reference will now be made in detail to the present exemplary embodiments of the disclosure, examples of which are illustrated in the accompanying drawings. Wherever possible, the same reference numbers will be used throughout the drawings to refer to the same or like parts.

Figure 1A:
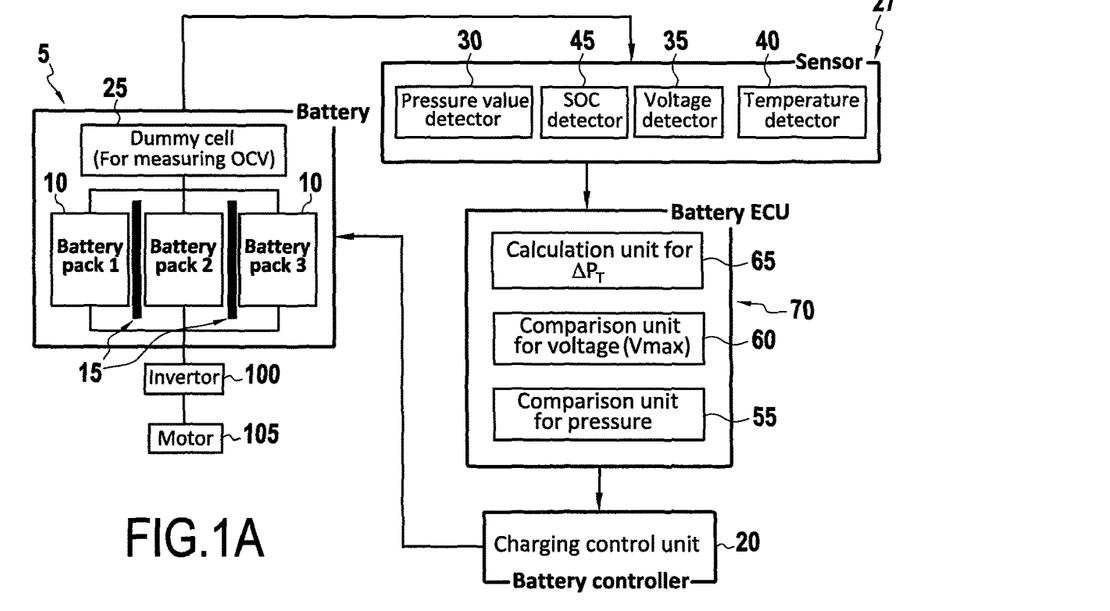
FIG. 1A is a schematic diagram of a discharging system for a battery according to embodiments of the present disclosure.

FIG. 1A is a schematic diagram of a discharging system for a battery according to embodiments of the present disclosure. The system may include a battery 5, one or more sensors 27, battery control unit 70, and a discharging control unit 20. Battery 5 may include one or more battery packs 10, one or more pressure sensing membranes 15, and a dummy cell 25, among others.

Battery 5 may be any suitable type of battery, for example, a lithium ion battery, a NiMH battery, lead acid battery, etc.

Battery 5 may be connected to an inverter 100 which may in turn be connected to one or more motors 105, to permit energy stored in battery 5 during a charging process to be stepped up by inverter 100 and fed to motor 105 during a discharging process, thereby resulting in movement of the vehicle.

Battery packs 10 may be installed within a housing associated with battery 5. For example, battery 5 may include a housing 11 comprising any suitable material for housing battery packs 10, e.g., of metal, plastic, composite, etc. Such a housing 11 may be configured to have one or more battery packs 10 placed and connected therein, and subsequently the housing 11 may be closed, e.g., by fastening (e.g., bolting) a cover onto an open portion of the housing 11.

According to some embodiments, one or more bolts (not shown) may extend over a length or width of the housing and following placement of a cap (not shown) over the open portion of housing 11, a nut may be affixed to the one or more bolts and tightened, resulting in closure of the housing 11. One of ordinary skill in the art will understand that bolted configurations of this type may undergo a creep phenomenon in which changing stresses applied to the bolts over time result in permanent deformation of the bolts used for the fastening, and an expansion/enlarging of space within the internal cavity of battery 5 housing the battery packs 10. Therefore, pressure within the internal cavity of battery 5 changes based on expansion and contraction of the battery packs 10 and as a function of creep. Embodiments of the present disclosure take such creep and expansion/contraction into account as described below.

Each battery pack 10 present in battery 5 may be connected in series or in parallel to other battery packs 10 present in battery 5. One of skill in the art will recognize that various criteria such as a desired voltage, a desired maximum current, etc. may be considered when designing a battery and connections as described herein.

One or more pressure sensors 15 may be provided within battery 5. For example a pressure sensor 15 may be placed in between each battery pack 10 within battery 5, such that pressure arising due to expansion of each battery pack 10 during charging may exert a force on the one or more pressure sensors 15 based on the amount of expansion. In addition, pressure sensors 15 may further be provided between an end of the housing 11 of battery 5 and the terminal battery pack 10 within battery 5.

Similarly during discharging, pressure decreasing due to contraction of each battery pack 10 within battery may reduce force exerted on the one or more pressure sensors 15 based on the amount of contraction.

Figure 2:
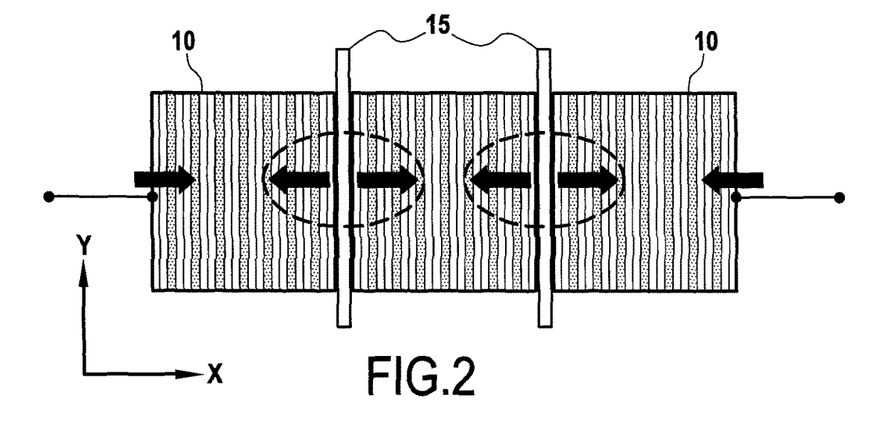
FIG. 2 shows an exemplary representation of an internal portion of a battery including pressure sensors.

According to some embodiments, pressure sensors 15 may be positioned parallel to a laminated direction of the battery packs 10 within battery 5 (see FIG. 2).

The number of pressure sensors included within battery 5 may be determined based on the number of battery packs 10, and/or any other criteria one of skill in the art may determine suitable. For example, where to battery packs 10 are present within battery 5, one pressure sensor 15 may be placed between these two battery packs 10. Similarly where three battery packs are present within battery 5, two pressure sensors 15 may be placed within battery 5, a first pressure sensor 15 in between the first battery pack any secondary pack, and a second pressure sensor 15 placed in between the second battery pack and the third battery pack.

Pressure sensor 15 may comprise any suitable pressure sensing device, and may be, for example, a tactile sensor having a thickness suitable for measuring expansion and contraction of battery packs 10. According to some embodiments a thickness of pressure sensor 15 may range between, 0.01 mm and 1 mm, and according to some embodiments, 0.1 mm.

Once the battery 5 has been assembled and closed, for example with a cover bolted to battery housing 11 as described above, an initial pressure $P_{initial}$ inside battery 5 may be measured at a plurality of open circuit voltages of the battery (e.g., OCVs corresponding to SOCs of between 10 and 100 percent at increments every 5 percent), and these values stored in memory of battery ECU 70. These values may be used throughout the life of battery 5 as a comparison to a current pressure P within battery 5, as measured by pressure sensors 15 and pressure detector 30.

In addition, a predetermined minimum threshold pressure $P_{min}$ may be determined based on a first lower limit voltage corresponding to a design lower limit SOC of the battery. For example, $P_{min}$ may correspond to a SOC of the battery of between 10 and 20 percent.

FIG. 2 shows an exemplary representation of an internal portion of a battery including pressure sensors. Arrows shown at FIG. 2 represent pressure forces on pressure sensors 15 as well as, at the external portion of the left and right battery packs 10, forces exerted on the walls of housing 11 battery 5 based on expansion/contraction of battery packs 10. One of skill in the art will understand that while battery packs 10 may also exert forces in the Y direction, for purposes of the present disclosure forces exerted in the X direction will be considered for determination of pressure within battery 5.

Battery 5 may also include one or more dummy cells 25 conductively linked to battery packs 10 to permit measurement of an open circuit voltage $V_{ocv}$ across the totality of battery packs 10 present within battery 5. For example, a dummy cell 25 configured to provide a dummy load may be connected in parallel with each of battery packs 10 present within battery 5, and the output (i.e., open circuit voltage) may be provided to sensor bank 27, and more particularly voltage detector 35. One of skill in the art will recognize that more than one dummy cell 25 may be provided, for example one dummy cell for each battery pack 10 present in battery 5, and such a configuration may aid in determination of a faulty or failing battery pack 10.

Figure 1B:
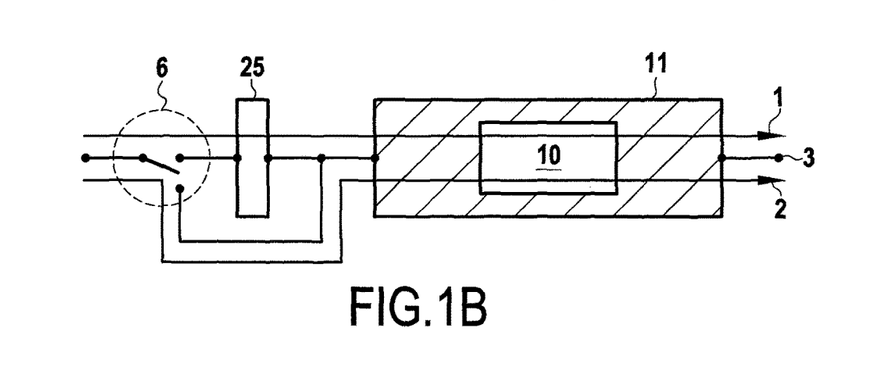
FIG. 1B is a schematic diagram of an exemplary open circuit voltage measuring configuration.

FIG. 1B shows an exemplary schematic including dummy cell 25 connected with battery 5 and a switch 6 configured to close a connection of dummy cell 25 thereby engaging circuit 2. Closing of switch 6 thereby enables measuring an open circuit voltage $V_{ocv}$ across circuit 2 shown in FIG. 1B, while normal operation of battery 5 (i.e. while not measuring an open circuit voltage $V_{ocv}$ of battery 5) utilizes circuit 1.

In addition to pressure sensors 15 and dummy cell 25, battery 5 may include additional sensors, for example one or more temperature sensors, current sensors, etc. Sensors present in battery 5 may be configured to provide signals to sensor bank 27, thereby enabling sensor bank 27 to monitor information associated with battery 5 during a discharging and/or charging process (e.g. open circuit voltage $V_{ocv}$, pressure, temperature, etc.) and to provide the information to battery ECU 70, among others.

Sensor bank 27 may include a pressure value detector 30, a state of charge detector 45, a voltage detector 35, a temperature detector 40, among others. For example pressure sensors 15 may be configured to provide information to pressure value detector 30, in order to enable pressure value detector 30 to determine a pressure force being exerted on pressure sensor 15.

Similarly voltage detector 35 may receive input from dummy cell 25 in order to determine an open circuit voltage $V_{ocv}$ of battery 5, and/or of each individual battery pack 10 within battery 5.

State of charge detector 45 may be configured to receive current information from a current sensor as well as voltage information from dummy cell 25 in order to determine a state of charge (SOC) of battery 5.

Temperature detector 40 may be configured to receive information from a temperature sensor within battery 5 in order to determine the temperature of battery 5.

Values from sensor bank 27 may be provided to battery ECU 70, with battery ECU 70 providing command signals battery controller 20 (e.g. discharging control commands). For example battery ECU 70 may include a calculation unit 65 for determining a threshold pressure differential $\Delta P_T$ which may be calculated based on an open circuit voltage $V_{ocv}$ of battery 5 as measured by voltage detector 35 and a current pressure P within battery 5 as measured by pressure value detector 30 during a pre-discharging process (i.e., before battery 5 begins discharging). This will be described in greater detail below with reference to FIGS. 4, 5A and 5B.

Battery ECU 70 may further include a voltage comparison unit 60 configured for comparing a current voltage V as measured by voltage detector 35 (i.e., the open circuit voltage $V_{ocv}$ of battery 5) with a predetermined initial maximum voltage $V_{max}$ of battery 5. One of skill in the art understands that an initial maximum voltage $V_{max}$ of battery 5 may be determined in advance based on a design of the battery, and stored in, for example, a read-only memory (ROM) associated with battery ECU 70, or another computer present on the vehicle. Further, for purposes of the present disclosure, it will be assumed that the current voltage V and open circuit voltage $V_{ocv}$ of battery 5 at any particular point in time are equal.

Pressure comparison unit 55 may also be provided in ECU 70 for comparing a pressure differential ΔP measured during the discharging process by pressure value detector 30 (e.g. via repeated sampling by pressure value detector 30 of pressure sensors 15), with threshold pressure differential $ΔP_T$. In addition, pressure comparison unit 55 may be configured to compare a current pressure P with the predetermined minimum threshold pressure $P_{min}$.

Battery ECU 70 may include memory configured to store values obtained from sensor bank 27, among others. For example, battery ECU 70 may store pressure values obtained from pressure value detector 30, voltage values obtained from voltage detector 35, temperature values obtained from temperature detector 40, etc. as well as map values associated with data experimentally obtained from an exemplary battery design corresponding to the battery 5 installed in the vehicle.

A history of values may be compiled and stored over the life of the battery 5 during use of the vehicle, and according some embodiments when the vehicle is stored (i.e., not being driven). By compiling such data it may be possible to determine the history of temperatures, voltages, pressures, etc. to which battery 5 has been subjected. Such a history may be used to augment processes described below for determining values to be used when compensating for creep.

One of skill in the art will understand that the memory associated with battery ECU 70 may be comprised within battery ECU 70, or may be present on and or in other systems of the vehicle providing communication access to battery ECU 70.

Battery controller 20 may comprise any suitable battery controller configured to control a discharging process resulting in the discharging the battery packs 10 associated with battery 5. As one of skill in the art understands, lithium ion batteries in particular require relatively strict discharging circumstances to be maintained during a battery discharging process in order to avoid dangerous conditions such as overheating and over-discharging. Therefore, battery controller 20 may be configured to control current and voltage allowed to flow from battery 5 during the discharging process, among others. For example, when it is determined that a battery is not fully discharged battery controller 20 may allow current I at voltage V to flow thereby discharging battery 5.

Figure 3:
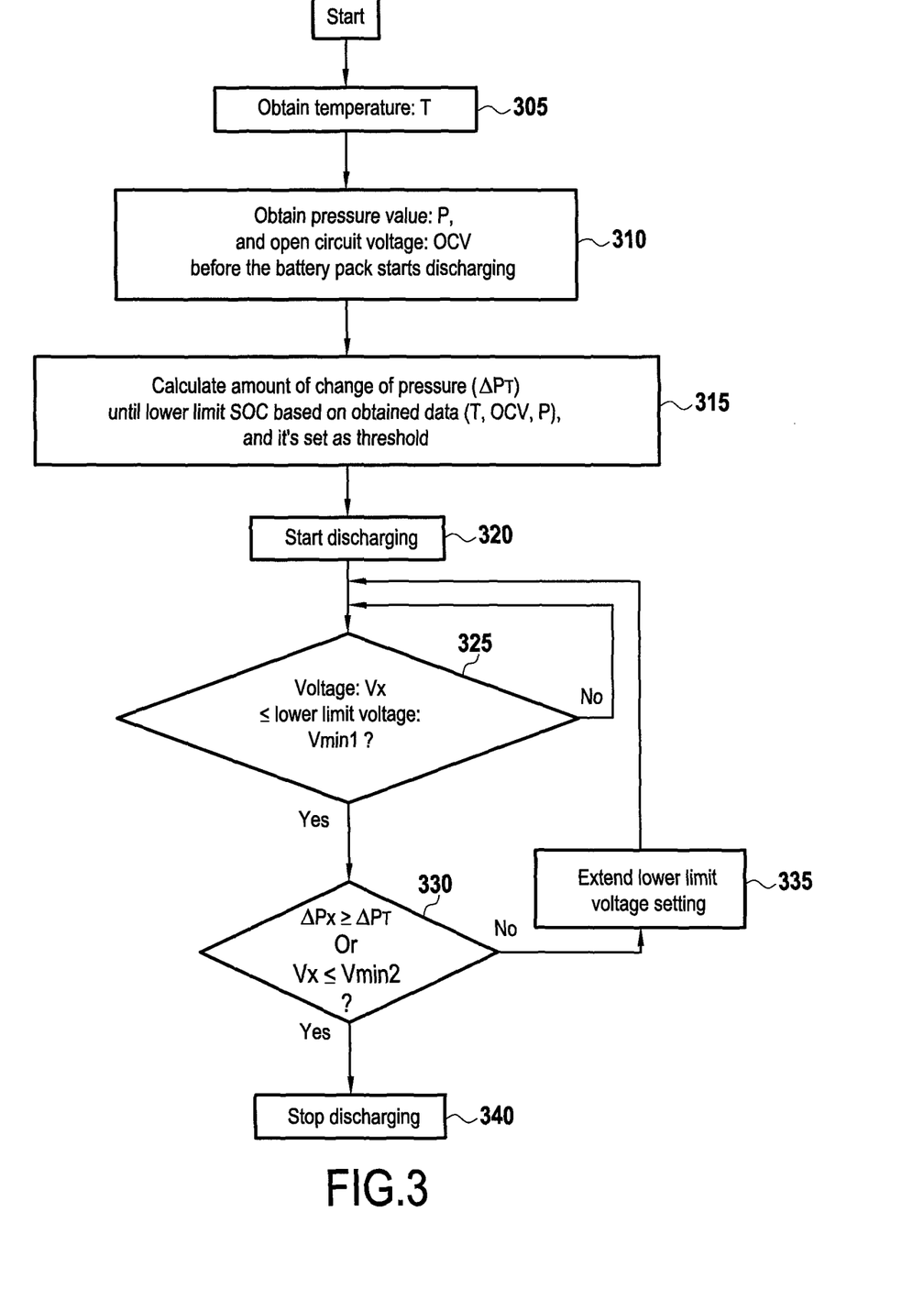
FIG. 3 is a flowchart showing one exemplary method for charge control according to embodiments of the present disclosure.

FIG. 3 is a flowchart showing one exemplary method for discharge control according to embodiments of the present disclosure. In a pre-discharging process (i.e. before discharging a battery 5 begins) battery ECU may initially obtain a temperature of battery 5 as determined by temperature detector 40 based on information provided by a temperature sensor present in battery 5 (step 305).

A current pressure P within battery 5 is then obtained from pressure value detector 30 based on information provided by pressure sensors 15 within battery 5 and an open circuit voltage $V_{ocv}$ obtained by placing switch 6 in a position such that circuit 2 is engaged thereby permitting measurement of open circuit voltage $V_{ocv}$ by voltage detector 35 (step 310).

A threshold pressure differential $ΔP_T$ may then be determined based on at least one of a temperature, open circuit voltage $V_{ocv}$, and the present pressure P of battery 5 (step 315). The process for determining the threshold pressure differential $ΔP_T$ and compensating for creep will be discussed with reference to FIGS. 4, 5A, and 5B.

Figure 4:
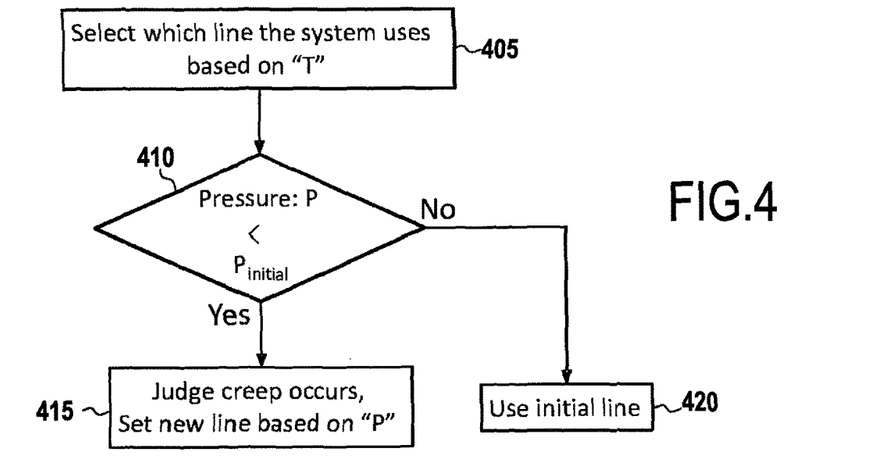
FIG. 4 is a flowchart showing one exemplary method for creep compensation.
Figure 5A:
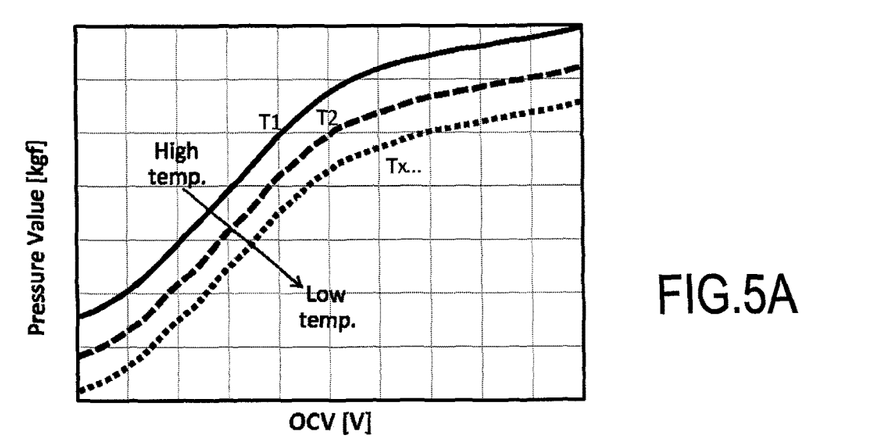
FIGS. 5A and 5B are representations of an exemplary map for applying the exemplary method of FIG. 4.
Figure 5B:
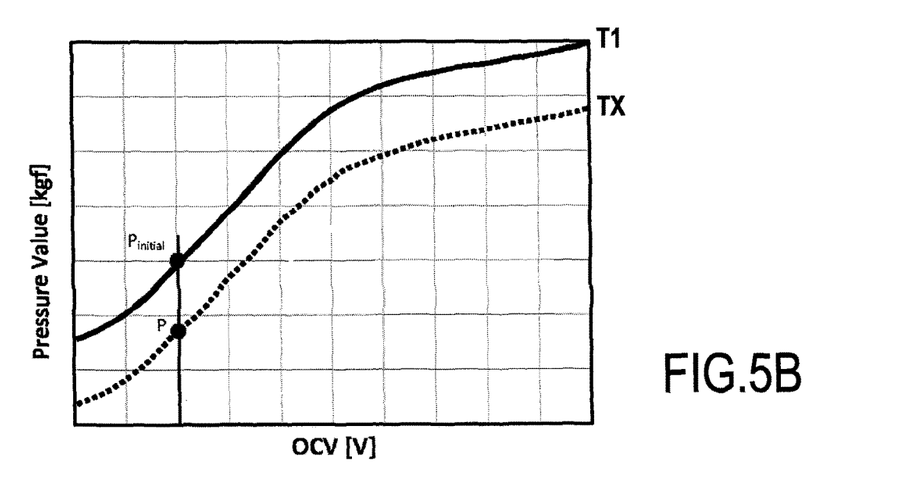

FIG. 4 is a flowchart showing one exemplary method for creep compensation using a current temperature T of battery 5, while FIGS. 5A and 5B are representations of an exemplary experimentally determined data map relating temperature, pressure, and open circuit voltage $V_{ocv}$ of an exemplary battery. As will be discussed, such maps may be used for determining a threshold pressure differential $ΔP_T$.

The data map of FIGS. 5A and 5B may be created in advance based on experimental data obtained on an exemplary battery 5 in an assembled condition and stored in memory of ECU 70. For example an assembled battery 5 may be subjected to various temperatures T (e.g. at increments of 10 degree C., between −40 degrees C. and 60 degrees C.) at predetermined intervals of open circuit voltages (e.g., an interval of 0.01 V)

An internal pressure P of battery 5 may then be measured at each of these temperatures T and open circuit voltages. For each 10 degree C. increment, a collection of map points demonstrating a relationship between open circuit voltage $V_{ocv}$ and internal pressure of battery 5 at the particular temperature may be created and stored based on the measured pressure P at the open circuit voltage $V_{ocv}$ increment. Such a collection of map points corresponds, to each of lines T1-Tx shown in FIG. 5A. Notably, temperatures falling between lines of the 10 degrees C. lines (or any other selected interval) may then be interpolated by, for example, linear interpolation.

In order to determine a threshold pressure differential $ΔP_T$, ECU 70 may obtain a current temperature T of battery 5 from temperature detector 40 (step 405). Based on the determined current temperature T of battery 5, ECU 70 may refer to the data map as generated above, see FIG. 5A, to select map data (i.e., an initial temperature line) for example, T1.

Voltage comparison unit 60 may then obtain the current open circuit voltage $V_{ocv}$ of battery 5, thereby enabling identification of a point along the selected map data (e.g., temperature line T1) shown at 5A.

Pressure comparison unit 55 may then obtain a current pressure P within battery 5 from pressure value detector 30 and compare the current pressure P to determine whether it is less than the initial pressure $P_{initial}$ as measured at the same temperature following completion of battery assembly (step 410). If the current pressure P is equal to or within a reasonable tolerance (e.g., ±5 bar, ±10 bar, etc.) of the initial pressure $P_{initial}$, then the initially selected map data (e.g., temperature line T1) is used for determination of the applicable threshold pressure differential $ΔP_T$ (step 420).

Where the current pressure P is determined to be less than the initial pressure $P_{initial}$ for the current temperature and open circuit voltage $V_{ocv}$, creep has likely occurred and therefore new map data should be selected from the data map to compensate for creep (step 415).

This compensation for creep may be performed, according to some embodiments, by traversing the y-axis directly from the initial pressure $P_{initial}$ to the point at the current pressure P and current open circuit voltage $V_{ocv}$. The intersection of this point on a collection of map data (e.g., temperature line Tx) may then be selected as the new map data. An exemplary representation of this determination can be seen at FIG. 5B. If the point P does not fall directly on a predetermined collection of mapped data, a temperature line Tx falling outside of a 10 degree C. increment may be interpolated by, for example, linear interpolation at the current pressure P and the current open circuit voltage $V_{ocv}$.

Figure 6A:
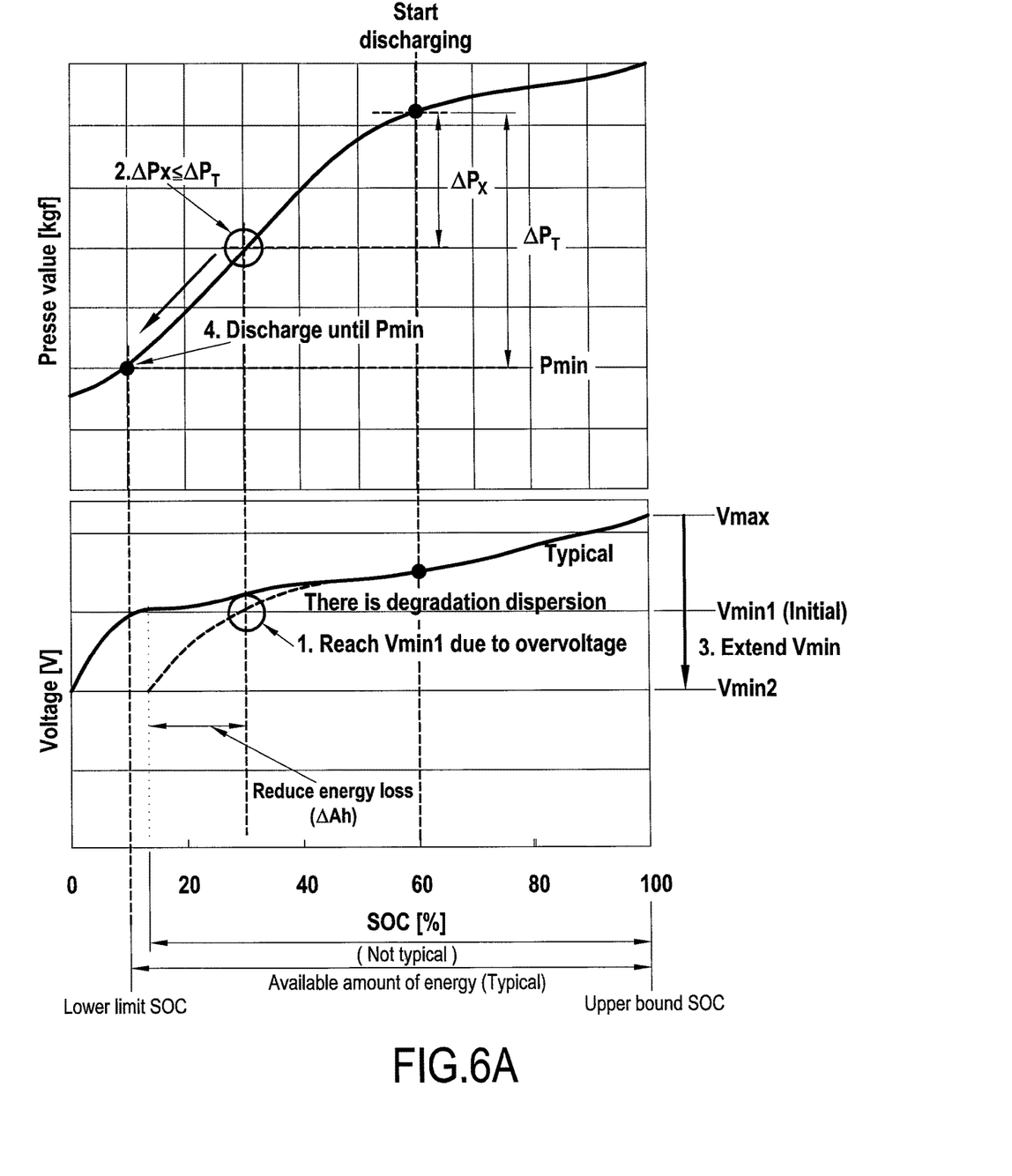
FIGS. 6A and 6B are exemplary graphs showing a relationship between pressure, voltage, and available energy during a discharging process.
Figure 6B:
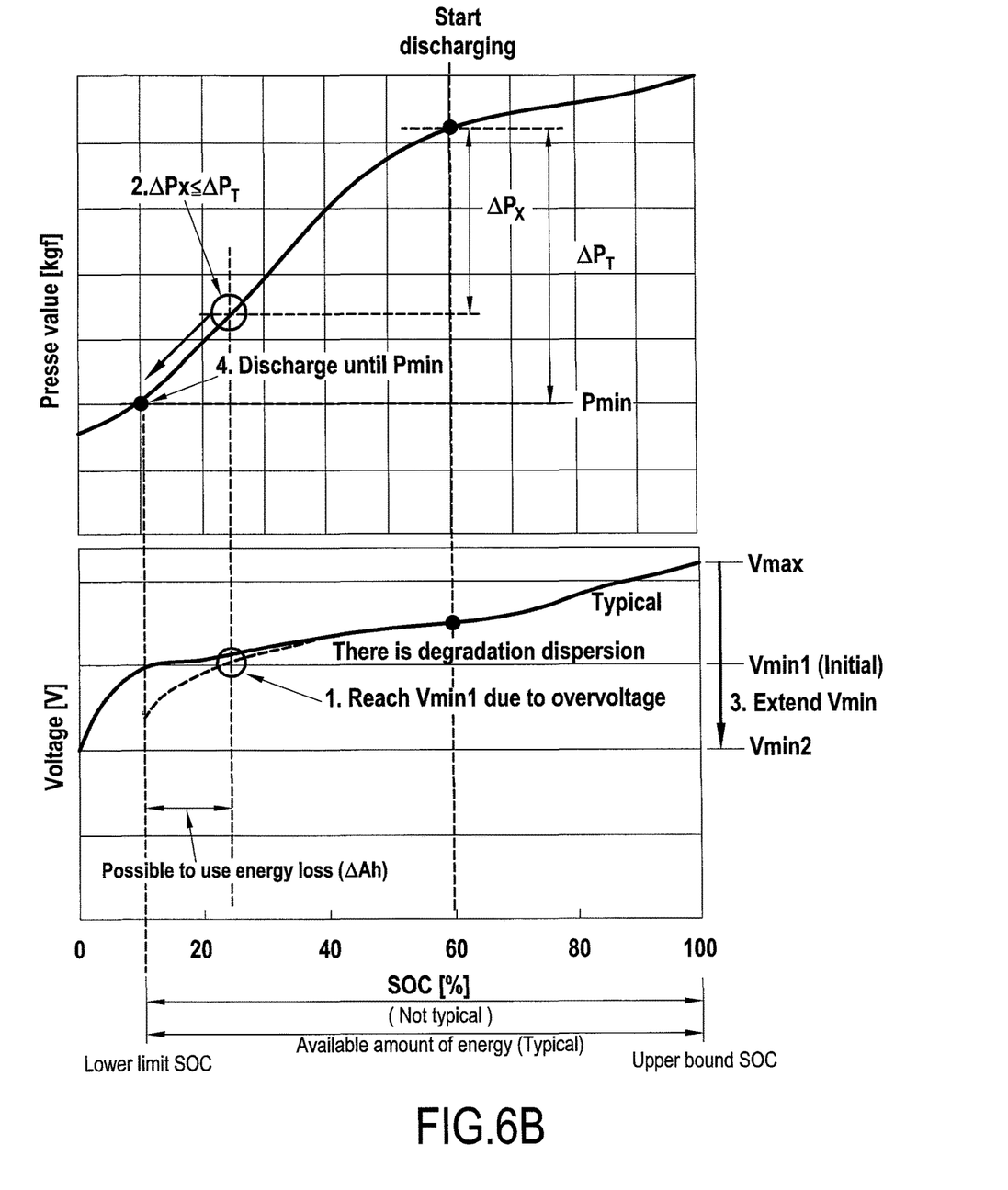

To determine the threshold pressure differential $\Delta P_T$, a pressure change from the current pressure on the selected temperature line to predetermined minimum threshold pressure $P_{min}$ associated with a desired minimum open circuit voltage (OCV) or state of charge (SOC) of battery may be determined using the map shown at FIG. 6A or 6B. Equation 1 demonstrates an exemplary method of calculating the threshold pressure differential for a given $P_x$.

$$\Delta P_T = P - P_{min} \qquad (1)$$

Where pressure $P_{min}$ is determined experimentally at a range of temperatures for an exemplary new battery 5 having a desirable remaining level of charge after discharge (e.g., 20 percent state of charge).

Once the threshold pressure differential $\Delta P_T$ has been calculated by calculation unit 65, discharging may begin, and battery controller 20 may allow current to begin flowing from battery 5 (step 320).

During the discharging process, battery 5 may be continuously monitored (e.g., at a predetermined sampling rate) and voltage comparison unit 60 may receive information from voltage detector 35 indicating a current open circuit voltage $V_{ocv}$ of battery 5. Voltage comparison unit 55 may compare the voltage V with a first lower limit voltage $V_{min1}$ of battery 5, which may have been determined based on the design characteristics of battery 5 and its intended charge level (step 325). The first lower limit voltage $V_{min1}$ may be stored in memory associated with battery ECU 70 for access by voltage comparison unit 60. During discharging, Where the current voltage V is not less than the first lower limit voltage $V_{min1}$ (step 325: no), battery controller 20 allows discharging to continue uninterrupted for the present sample.

When it is determined that the current voltage V is less than or equal to the first lower limit voltage $V_{min}$ (step 325: yes) a current pressure differential $\Delta P$ is determined based on equation 2.

$$\Delta P = P - P_x \qquad (2)$$

$P_x$ being a current internal pressure of the battery 5 at a time t where the current voltage V is equal to or has fallen below first lower limit voltage $V_{min1}$, and P being the pressure determined during the pre-discharging process at step 315.

Pressure comparison unit 55 may then compare the current pressure differential $\Delta P$ to the threshold pressure differential $\Delta P_T$ to determine whether the current pressure differential $\Delta P$ is greater than the determined threshold pressure differential $\Delta P_T$, while voltage comparison unit 55 compares the current voltage V to a second lower limit threshold value $V_{min2}$ (step 330).

The second lower limit threshold value $V_{min2}$ is a voltage that is less than the first lower limit threshold value $V_{min1}$.

Where the current pressure differential $\Delta P$ is determined to be greater than or equal to the threshold pressure differential $\Delta P_T$ and/or the current voltage V is determined to be less than or equal to the second lower limit threshold value $V_{min2}$ (step 330: yes), battery controller 20 may stop allowing discharge of the battery (i.e. stop flow of current from the battery 5).

If it is determined that the current pressure differential $\Delta P$ is less than the threshold pressure differential $\Delta P_T$ and the current voltage V is greater than the second lower limit threshold voltage $V_{min2}$ (step 330: no) the first lower limit voltage $V_{min1}$ may be decreased by a predetermined increment (e.g., 1V) for the present charging cycle to $V_{min1}'$. In other words based on the fact that neither the threshold pressure differential $\Delta P_T$ nor the second lower limit voltage $V_{min2}$ have not been exceeded, it can be reasonably assumed that the battery 5 has not reached its rated discharge state, and therefore the first lower limit voltage $V_{min1}$ is currently too high at a present condition of battery 5. By basing the charge cycle on both $V_{min1}$, $V_{min2}$ and $\Delta P_T$, it becomes possible to better enable the battery to reach a lower state of charge and avoid loss of energy storage. One of skill will recognize based on the above that $V_{min2}$ may initially be set as ($V_{min1} + \Delta V$ which equals $V_{min2} - V_{min1}$), and in such a case, step 335 may not be used again.

FIGS. 6A and 6B shows exemplary graphs indicating a relationship between pressure, voltage, and available energy during a discharging process, as described above.

As shown in the lower graph of FIG. 6A although the first lower limit voltage $V_{min1}$ may be reached, the current pressure differential $\Delta P$ has not exceeded the threshold pressure differential $\Delta P_T$ and the voltage V has not fallen below second lower limit voltage $V_{min2}$. Therefore the first lower limit voltage $V_{min1}$ may be decreased (see 3 in the bottom graph of FIG. 6), and the battery 5 permitted to discharge for an additional period of time, this additional discharging corresponding to an otherwise lost amount of energy stored in battery 5.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

It is intended that the specification and examples be considered as exemplary only, with a true scope of the disclosure being indicated by the following claims.

The invention claimed is:

1. A discharging control system for a battery, comprising:
   a temperature sensor configured to provide a temperature value associated with the battery;
   a voltage sensor configured to provide a voltage value associated with the battery;
   a pressure sensor configured to provide a pressure value associated with an internal portion of the battery; and
   a controller configured to:
   determine, before a discharging process is started, a threshold pressure change associated with a discharge of the battery based on map data selected from a predetermined data map associated with the battery;
   monitor, during the discharging process, a present voltage value obtained by the voltage sensor, a current pressure value, and a total pressure change based on the current pressure value obtained by the pressure sensor;

permit continuation of the discharging process when the present voltage value falls below a first lower limit voltage value if the total pressure change is less than the threshold pressure change and the current pressure value is greater than a predetermined minimum threshold pressure; and prohibit continuation of the discharging process when any one of the following conditions is true:
(i) the present voltage value falls below a second lower limit voltage value that is lower than the first lower limit voltage value;
(ii) the total pressure change is greater than or equal to the threshold pressure change; or
(iii) the current pressure value is lower than the predetermined minimum threshold pressure.

2. The discharging control system according to claim 1, wherein the selection of the map data is based on a pre-discharging temperature value obtained from the temperature sensor, a pre-discharging voltage value obtained from the voltage sensor, and a pre-discharging pressure value obtained from the pressure sensor.

3. The discharging control system according to claim 1, wherein the controller is configured to decrease the first lower limit voltage value when the present voltage value falls below the first lower limit voltage value, if the total pressure change is less than the threshold pressure change and the current pressure value is higher than the minimum predetermined pressure.

4. The discharging control system according to claim 1, wherein the controller is further configured to compensate for creep in one or more portions of the battery by modifying at least one of the pressure information based on an initial internal pressure measurement, the pre-discharging process pressure value, and the pre-discharging temperature value.

5. The discharging control system according to claim 4, wherein the controller is configured to compare the initial internal pressure measurement and the pre-discharging pressure value, and when the initial internal pressure measurement is greater than the pre-discharging process pressure value, select new map data associated with the pre-charging pressure value.

6. The discharging control system according to claim 5, wherein the predetermined map comprises a collection of experimentally measured internal pressures, open circuit voltages, and temperatures of a representative battery under representative conditions of use of the battery.

7. The discharging control system according to claim 1, wherein the pressure sensor comprises at least one tactile sensor embedded in the battery.

8. The discharging control system according to claim 7, wherein the at least one tactile sensor is positioned parallel to a laminated direction of a battery cell of the battery.

9. The discharging control system according to claim 1, further comprising a state of charge sensor configured to determine a state of charge of the battery.

10. The discharging control system according to claim 1, wherein the voltage sensor comprises a dummy cell connected to one or more battery packs associated with the battery.

11. The discharging control system according to claim 1, wherein the voltage value is an open circuit voltage of the battery.

12. The charging control system according to claim 1, wherein the battery comprises at least one of a lithium-ion solid-state battery and a lithium-ion liquid electrolyte battery.

13. A vehicle comprising the discharging control system according to claim 1.

14. A method for discharging a battery, comprising:
determining a temperature value associated with the battery;
determining a voltage value associated with the battery;
determining a pressure value associated with an internal portion of the battery;
determining, before a discharging of the battery is started, a threshold pressure change associated with a full discharge of the battery based on map data selected from a predetermined data map associated with the battery;
discharging the battery;
monitoring, during the discharging, a present voltage value obtained by the voltage sensor and a total pressure change based on a present pressure value obtained by the pressure sensor;
permitting continuation of the discharging process when the present voltage value falls below a first lower limit voltage value if the total pressure change is less than the threshold pressure change and the current pressure value is greater than a predetermined minimum threshold pressure; and
prohibiting continuation of the discharging process when any one of the following conditions is true:
(i) the present voltage value falls below a second lower limit voltage value that is lower than the first lower limit voltage value;
(ii) the total pressure change is greater than or equal to the threshold pressure change; or
(iii) the current pressure value is lower than the predetermined minimum threshold pressure.

15. The method according to claim 14, wherein the selection of the map data is based on a pre-charging temperature value obtained from the temperature sensor, a pre-charging voltage value obtained from the voltage sensor, and a pre-charging pressure value obtained from the pressure sensor.

16. The method according to claim 14 comprising decreasing the upper limit voltage value when the present voltage value falls below the lower limit voltage value, and the total pressure change is less than the threshold pressure change.

17. The method according to claim 14, comprising compensating for creep in one or more portions of the battery by modifying the selected map data based on an initial internal pressure measurement, the pre-charging process pressure value, and the pre-charging temperature value.

18. The method according to claim 17, comprising comparing the initial internal pressure measurement and the pre-discharging pressure value; and
when the initial internal pressure measurement is greater than the pre-discharging process pressure value, selecting new map data associated the pre-discharging pressure value.

19. The method according to claim 18, wherein the new threshold pressure change is set based on a predetermined map created as a function of experimentally measured internal pressures, open circuit voltages, and temperatures of a representative battery under representative conditions.

20. The method according to claim 14, comprising determining a state of charge of the battery and modifying the threshold pressure change based on the state of charge of the battery before the discharging is started.

21. The method according claim 14, wherein the battery comprises at least one of a lithium-ion solid-state battery and a lithium-ion liquid electrolyte battery.

* * * * *